United States Patent Office 2,786,046
Patented Mar. 19, 1957

2,786,046

COPOLYMERS OF VINYLIDENE CYANIDE WITH ACENAPHTHYLENE

Floyd D. Stewart, Akron, Ohio, assignor to The B. F. Goodrich Company, New York, N. Y., a corporation of New York No Drawing. Application January 7, 1954, Serial No. 402,823

8 Claims. (Cl. 260—78.5)

This invention relates to the preparation of novel copolymers of vinylidene cyanide with acenaphthylene which copolymers are extremely useful in the preparation of filaments and films.

In U. S. Patents 2,476,220; 2,502,412 and 2,514,387 novel methods for the preparation of monomeric vinylidene cyanide are disclosed. In U. S. Patent 2,589,294, methods for the preparation of useful homopolymers of vinylidene cyanide are disclosed.

Monomeric vinylidene cyanide is a clear liquid at room temperature and a crystalline solid at 0° C. It melts in the range of 6.0° C. to 9.7° C. depending upon purity, the pure samples melting at 9.0° C. to 9.7° C., and it boils at 40° C. at a reduced pressure of 5 mm. mercury. Monomeric vinylidene cyanide is quite unstable because of its extreme sensitivity to water, undergoing on contact with water at room temperature an instantaneous homopolymerization reaction to give a solid, water-insoluble resin. When monomeric vinylidene cyanide is allowed to stand at room temperature in admixture with butadiene-1,3, it reacts therewith to give solid 4,4-dicyano cyclohexene.

It has now been discovered that when monomeric vinylidene cyanide of the above physical and chemical characteristics is copolymerized with acenaphthylene, in the presence of a free radical catalyst, new and highly useful copolymers are obtained.

Acenaphthylene which is polymerized with vinylidene cyanide in accordance with the present invention possesses the structure

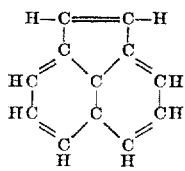

The polymerization itself may be carried out in several different ways. One preferred method consists in first dissolving the vinylidene cyanide and the acenaphthylene in benzene or other liquid aromatic solvent such as toluene, xylene, chloro benzene, nitro benzene or the like, preferably in an amount such that the solvent comprises approximately 30 to 80% by weight of the total solution. This solution is then maintained at a temperature of about —15° C. to 100° C. in the presence of a free radical catalyst whereupon polymerization occurs to form the desired copolymer as a white polymer of small particle size. The copolymer thus formed may be separated from the polymerization medium simply by filtering, or if desired the polymerization medium may be removed by an evaporation process.

A second method of polymerization consists in agitating the monomers in a liquid aliphatic hydrocarbon (which are non-solvents for vinylidene cyanide), for example, hexane or heptane, and heating in the presence of a polymerization catalyst whereupon the copolymer forms and may be separated from the polymerization medium by filtering or by evaporation of the solvent. It is important when utilizing either of these methods that the liquid organic diluent be free from impurities which initiate the ionic polymerization of vnylidene cyanide.

Alternately, the polymerization may be carried out without the use of a solvent or other liquid medium for the monomers, that is simply by heating and agitating a mixture of the monomers in the presence of a polymerization catalyst. The polymerization may be effected at temperatures as low as —15° C. or lower, or as high as 100° C. or even higher.

The respective quantities of vinylidene cyanide and acenaphthylene in any polymerization charge are not critical since a useful copolymer is obtained regardless of the amount of either monomer in the charge. The amount of vinylidene cyanide in the monomer charge may be as low as 5.0 mole percent or as high as 99.0 mole percent while still obtaining copolymers differing markedly in properties from straight homopolymers of either the vinylidene cyanide or the acenaphthylene. When the molar amounts of the two monomers in the charge are approximately equal, the copolymer contains about 50 mole percent ($\pm 5\%$) of vinylidene cyanide.

It is to be understood, of course, that regardless of the polymerization method utilized, the polymerization should be stopped before either of the monomers is entirely consumed, in order that a true copolymer will be obtained. Otherwise, when either of the monomers is completely used up, the product will contain straight polymers obtained by polymerization of the remaining monomer. Accordingly, it is often desirable to add, continuously or intermittently, fresh quantities of one or both of the monomers, and also a catalyst and solvent, if desired, to the polymerization mixture during the full course of the polymerization, thus taking fullest advantage of the capacity of the equipment and in effect operating a continuous or semi-continuous process.

The catalysts which are suitable for use in the polymerization include the peroxygen compounds such as silver peroxide, the perborates, the percarbonates, benzoyl peroxide, caproyl peroxide, lauroyl peroxide, acetone peroxide, acetyl benzoyl peroxide, cumene hydroperoxide; o,o'-dibromo benzoyl peroxide; o,o'-dichloro benzoyl peroxide, caprylyl peroxide, pelargonyl peroxide, tertiary butyl hydroperoxide, tetralin peroxide and the like.

The following examples illustrate the preparation of copolymers of vinylidene cyanide with acenaphthylene in accordance with this invention, but are not to be construed as a limitation upon the scope thereof, for there are, of course, numerous possible variations and modifications. In the examples all parts are by weight unless otherwise indicated.

*Examples I to IX*

A series of nine vinylidene cyanide:acenaphthylene copolymers were prepared by dissolving both monomers in benzene in the presence of varying amounts of 2,4-dichloro benzoyl peroxide and maintaining the resulting solution at a temperature of 45° C. for a period of about five hours. White fine particle copolymers were obtained. The mole percent vinylidene cyanide charged and the catalyst concentrations employed are tabulated in the table below. The percent conversion based on weight of vinylidene cyanide charged, mole percent vinylidene cyanide and melting point range of the polymers are also recorded in the following table:

| Example | Mole Percent Vinylidene Cyanide in Polymerization Charge | Catalyst Weight Percent based on Monomer Charge | Percent Conversion Based on Vinylidene Cyanide Charge | Mole Percent Vinylidene Cyanide in Copolymer | Melting Point Range, °C. |
|---------|------|------|------|------|-----------|
| I       | 49.0 | 0.50 | 92.0 | 49.6 | 275 to 280 |
| II      | 49.0 | 1.0  | 93.0 | 49.5 | 275 to 280 |
| III     | 49.0 | 2.0  | 92.0 | 49.2 | 275 to 280 |
| IV      | 49.0 | 3.0  | 91.5 | 49.2 | 275 to 280 |
| V       | 50.0 | 1.0  | 92.0 | 47.9 | 275 to 280 |
| VI      | 50.0 | 3.0  | 93.0 | 48.0 | 275 to 280 |
| VII     | 50.0 | 5.0  | 95.0 | 47.8 | 275 to 280 |
| VIII    | 50.0 | 7.0  | 93.0 | 47.9 | 275 to 280 |
| IX      | 37.2 | 2.7  | 97.4 | 48.4 | 275 to 280 |

The above examples indicate that catalyst concentrations of about 0.5% to about 7.0% by weight based on the combined monomer charge can be employed effectively. Although the lowest catalyst concentration shown in the above examples is 0.50% by weight, catalyst concentrations as low as 0.001%, 0.01% or 0.10% and above are sufficient for the preparation of vinylidene cyanide acenaphthylene copolymers.

By regulating the amount of the catalyst, it is possible to control very accurately the molecular weight of the copolymer. For instance, to obtain a high molecular weight copolymer, a small quantity of catalyst is used, while low molecular weight copolymers are obtained by the use of large amounts of catalyst.

As disclosed in the foregoing examples, the copolymers of this invention are characterized by a definite softening temperature. The vinylidene cyanide-acenaphthylene copolymers of this invention can be utilized in industrial applications requiring exceptionally high melting thermoplastic materials without suffering the disadvantage of intense polymer degradation at high temperatures. The copolymers of this invention are useful in the preparation of molded objects, and may be melted, spun or cast into excellent sheets, films and rods.

Although specific examples of the invention have been described herein, it is not intended to limit the invention solely thereto, but to include all the variations and modifications falling within the spirit and scope of the appended claims.

I claim:
1. A copolymer of vinylidene cyanide with acenaphthylene.
2. A copolymer of vinylidene cyanide with acenaphthylene wherein the copolymer contains about 50 mole percent vinylidene cyanide.
3. A copolymer of vinylidene cyanide with acenaphthylene, said copolymer having a softening point range of from about 275° C. to about 300° C.
4. A method which comprises mixing together vinylidene cyanide and acenaphthylene maintaining the mixture free of ionic impurities which initiate homopolymerization of vinylidene cyanide, in the presence of a free radical catalyst, whereupon polymerization occurs to form a copolymer of vinylidene cyanide with acenaphthylene.
5. A method which comprises mixing together vinylidene cyanide and acenaphthylene in an inert diluent free from impurities which initiate the ionic homopolymerization of vinylidene cyanide, and maintaining the mixture at a temperature of from about −15° C. to about 100° C. in the presence of a free radical catalyst, whereupon polymerization occurs to form a copolymer of vinylidene cyanide and said acenaphthylene.
6. A method according to claim 5 wherein the free radical catalyst is 2,4-dichloro benzoyl peroxide.
7. A method which comprises mixing together vinylidene cyanide and acenaphthylene maintaining the mixture free of ionic impurities which initiate the homopolymerization of vinylidene cyanide, and maintaining the mixture at about 45° C. in the presence of a free radical catalyst, whereupon polymerization occurs to form a copolymer of vinylidene cyanide and acenaphthylene.
8. A method which comprises mixing together vinylidene cyanide and acenaphthylene, in the presence of a free radical catalyst and an inert diluent, maintaining the mixture at a temperature of about −15 to about 100° C. whereupon polymerization occurs to form a copolymer of vinylidene cyanide with acenaphthylene.

References Cited in the file of this patent

UNITED STATES PATENTS

| 2,510,647 | Miller et al. | June 6, 1950 |
| 2,615,865 | Ardis | Oct. 28, 1952 |
| 2,615,868 | Miller | Oct. 28, 1952 |

UNITED STATES PATENT OFFICE
CERTIFICATE OF CORRECTION

Patent No. 2,786,046 March 19, 1957

Floyd D. Stewart

It is hereby certified that error appears in the printed specification of the above numbered patent requiring correction and that the said Letters Patent should read as corrected below.

Column 3, in the table, second column thereof, last line, opposite Example IX, for "37.2" read -- 47.2 --.

Signed and sealed this 26th day of November 1957.

(SEAL)
Attest:

KARL H. AXLINE
Attesting Officer

ROBERT C. WATSON
Commissioner of Patents